Aug. 17, 1954  R. V. EECKHOUT  2,686,531
AUTOMATIC VENT AND RELIEF VALVE FOR PRESSURE COOKERS
Filed March 22, 1948  2 Sheets-Sheet 1
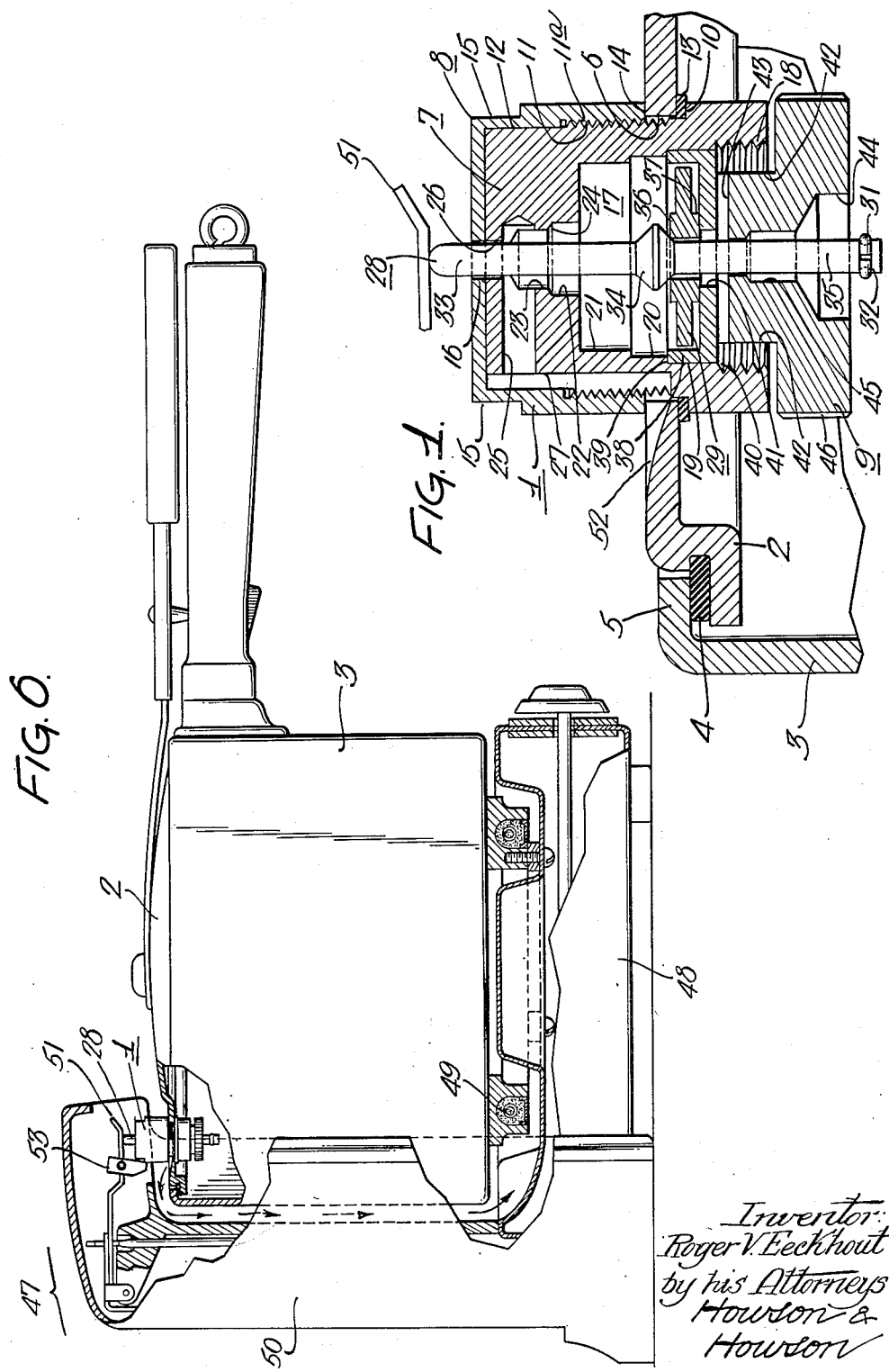

Aug. 17, 1954  R. V. EECKHOUT  2,686,531
AUTOMATIC VENT AND RELIEF VALVE FOR PRESSURE COOKERS
Filed March 22, 1948  2 Sheets-Sheet 2
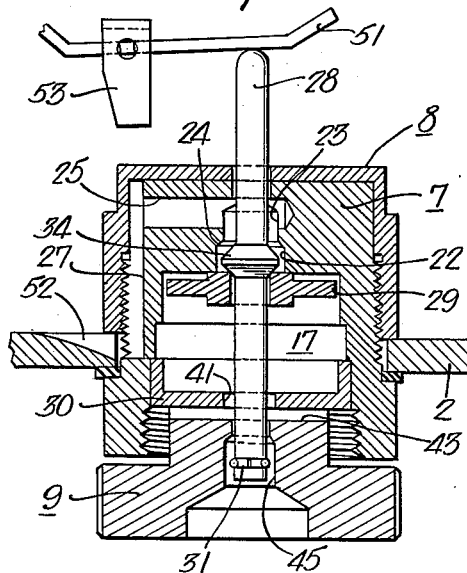
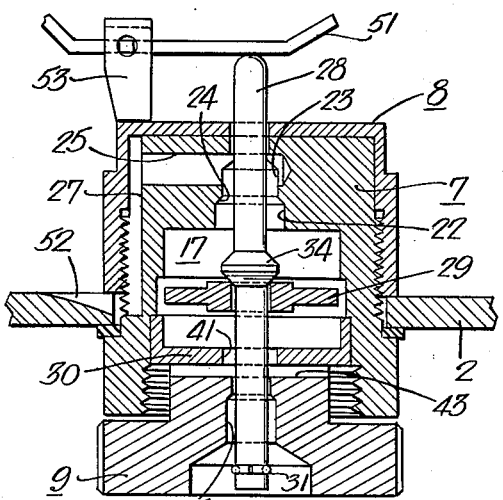
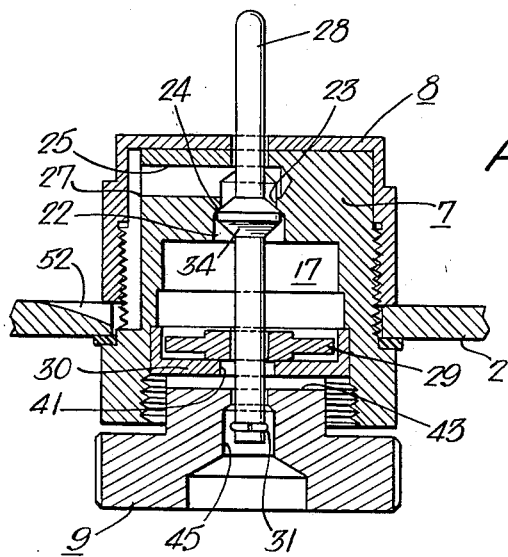
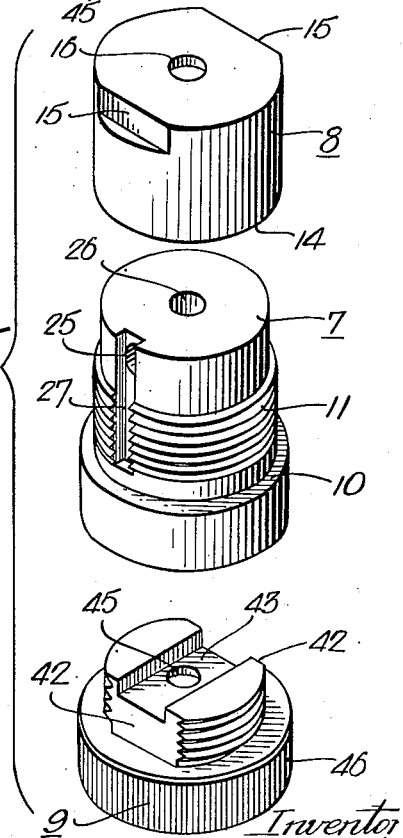
Inventor
Roger V. Eeckhout
by his Attorneys
Howson & Howson Patented Aug. 17, 1954

2,686,531

UNITED STATES PATENT OFFICE

2,686,531

AUTOMATIC VENT AND RELIEF VALVE FOR PRESSURE COOKERS

Roger V. Eeckhout, Philadelphia, Pa., assignor to Proctor Electric Company, Philadelphia, Pa., a corporation of Pennsylvania Application March 22, 1948, Serial No. 16,194

7 Claims. (Cl. 137—469)

This invention relates to improvements in actuating valves for pressure containers, and in particular relates to pressure operated actuating and relief valves such as are incorporated in automatic pressure cooking devices.

In U. S. Patent No. 2,641,680, issued June 9, 1953, to C. R. Turner and P. G. Turner, a pressure operated valve is shown in combination with a pressure cooking vessel and a heating coil having controls therefor actuated by the pressure operated valve. The pressure operated valve has several functions which are described in that patent and include movement of a piston member from one position to another as the pressure within the pressure cooking vessel rises initially to a predetermined value. Another function of the valve is to prevent pressure in the pressure cooking vessel from exceeding a second predetermined value, higher than the first predetermined value at which the piston member is moved. A third function of the valve is to provide for the venting of pressure from within the pressure cooking vessel, at a rate as rapid as possible commensurate with the quantity of heat in the contents of the cooking vessel. In the automatic cooker of that patent, the controls provide a downward force on the valve piston to break its seal on the venting orifice and to permit steam to escape from the interior of the vessel.

It has been found, in automatic pressure venting devices, that certain foods froth and go through a period of violent ebullition, as the pressure in the cooking vessel is reduced. As is well known and understood, liquids under pressure have a higher boiling temperature than when at a reduced pressure, or at atmospheric pressure. When the pressure in the cooking vessel is suddenly and substantially reduced, the total heat of its contents provides the required heat of evaporation to cause boiling of those contents. By experiment, the maximum rate of pressure venting has been determined, and that rate has been taken as the rate at which the frothing or increased ebullition will not cause the level of the contents to rise to the top of the vessel so as to clog the venting outlet. The period of time during which the pressure in the vessel is venting is a portion of the total cooking time which also includes the time under cooking pressure and the time taken to raise the temperature to that corresponding to the cooking pressure. It has been found that the maximum rate of venting is not fast enough in certain cases, as it adds too much time to the effective cooking period. For instance, certain foods having short cooking periods will overcook if normal maximum venting is used. Therefore, to avoid overcooking of these foods, some accelerated cooling means must be used.

It is normal kitchen practice, in the use of non-automatic pressure cooking vessels, to accelerate the cooling of such a cooking vessel by placing the entire vessel beneath a stream of cold water. This action rapidly removes from the heated vessel and its contents the heat which exists and maintains the elevated steam pressure. Of course, the stream of cold water is provided only long enough to reduce the pressure in the vessel to atmospheric, as lengthy heat removal will reduce too far the temperature of the contents of the vessel.

It is considered desirable to incorporate in an automatic pressure cooking device, having a pressure operated actuating valve, means permitting the pressure cooking vessel to be removed from its associated cooperative elements without causing venting of the steam pressure within the vessel. In an automatic device such as shown in the above-mentioned patent, when the pressure cooking vessel is removed from association with its cooperative elements, steam pressure is vented. Because of the extreme rapidity of the frothing as pressure is decreased, it is necessary that a prompt seal be effected to prevent venting as the vessel is removed.

A further problem which automatic pressure venting has caused to arise is concerned with the flavor of large cuts of meat, such as roasts, when cooked in a pressure cooker. These large cuts of meat hold a considerable quantity of heat, and the sudden reduction of pressure on these cuts of meat causes a degree of internal boiling which has a partial dehydrating effect. This dehydration tends to make meat quite dry, and to some people it is unpalatable. To prevent this dehydration, which occurs in non-automatic cookers when rapid cooling of the vessel walls causes a reduction in pressure without a corresponding reduction in the total heat of the contents of the cooker, the housewife normally removes her cooker from its source of heat and permits it to cool without venting. In automatic pressure cooking vessels of the type disclosed in the above-mentioned patent the pressure in the vessel is vented when the vessel is removed from association with its controls, and it has, therefore, been found desirable to provide for such a vessel means in the venting means which will permit normal cooling without venting, when the vessel is removed from its source of heat.

The primary object of this invention is to provide means in a combined pressure operated actuating and relief valve for an automatic pressure cooking device to permit the removal of the pressure cooking vessel from its associated cooperative elements without causing pressure to escape from the vessel.

With this object in mind, the invention contemplates a valving member so loaded by gravitational and measured external forces against internal steam pressure that when these forces are normally in opposition the valving member will act as a pressure relief valve and, further, when there is no external force opposing the internal steam pressure other than the gravitational forces produced by the weight of the member itself, the valving member will seal an orifice in communication between the interior of the vessel and the atmosphere and thus retain the pressure within the cooker.

A still further object is to provide means, in an automatic pressure cooker vent valve, for insuring initial actuating motion without escape of steam, and for venting the last increments of steam pressure from the vessel at a rate greater than the rate at which the full cooking pressure is initially vented.

Another object is to provide a combined pressure operated actuating and relief valve having provision for venting, which is adapted to mass production by standard machinery and which shall have no parts requiring unusual machining operations, and further, which shall be easily assembled into an operable device without the need for special fixtures or operations.

With these objects in mind, a clear understanding of the invention may be had from the following description and the accompanying drawings, in which:

Fig. 1 is a sectional view of the device in the lid of a pressure cooking vessel, showing the movable parts in the positions which they assume when no pressure exists in the pressure cooking vessel;

Fig. 2 is a sectional view showing the disposition of the elements when the vessel is in cooperative relation with associated parts of an automatic control device, and when the pressure in the vessel is in excess of the initial actuating pressure or equal to but not in excess of the full cooking pressure;

Fig. 3 is a sectional view showing the elements in the positions they are caused to assume during venting of the vessel;

Fig. 4 is a sectional view showing the disposition of the elements when at least a small pressure exists in the vessel and when the cooker has been removed from cooperative relation with the associated control device;

Fig. 5 is a perspective exploded view of certain parts of the valve device; and

Fig. 6 illustrates the device in cooperative association with control apparatus of the character shown in the above-mentioned application.

Referring particularly to Figs. 1 to 5, a pressure operated actuating valve 1 is fitted in the lid 2 of a pressure cooking vessel 3. This pressure cooking vessel may be of the type disclosed and shown in U. S. Patent No. 2,570,993 issued October 9, 1951, to C. R. Turner. A gasket 4, of rubber or other suitable compressible material, is fitted to the lid of the vessel so as to engage the underside of the lip 5 of the vessel and to provide a seal whereby the pressure inside the vessel is retained therein.

The valve 1 is of the general character of that disclosed and claimed in a copending application of John H. Hilldale, Serial No. 16,158, filed March 2, 1948. It is fitted in a suitable opening 6 in the lid of the vessel and is composed of a valve body 7, a cap 8, and a lower plug 9. The valve body 7, which is inserted through the opening 6 from the inside, has a shoulder section 10, a threaded section 11, and an upper portion 12 which tightly fits into the cap 8. A small gasket 13, of material such as that of gasket 4, is located on the shoulder 10 to seal the opening 6. The cap 8 is provided with an internal threaded portion 11a to engage the threaded section 11 of the valve body. It can be seen that the threaded insertion of the valve body into the cap, with subsequent tightening of the cap on the body, will retain the valve body in the lid. A shoulder bottom 14 of the cap 8 lands snugly on the lid top to prevent loose rotation of the assembly in the opening 6. The top of the cap 8 has two parallel sides 15, milled or otherwise formed to provide suitable surfaces such as may be engaged by a small tool to tighten the cap on the valve body. A small opening 16 is drilled centrally in the top, the purpose of which will be presently described.

The valve body 7 is essentially hollow, having a vari-stepped bore 17 along its axis. This bore, stepped so that it may be made by successive operations of a standard commercial screw machine lathe, has, starting at its lowest part of an internal threaded section 18, three parallel sided bores of decreasing diameter 19, 20, 21 and a bore 22 of substantially smaller diameter than the aforementioned three. This bore 22 is headed at 24 by a sealing shoulder from which a smaller diameter bore 23 continues. The uppermost bore 23 is of diameter equal to the opening 16 of the cap. A passage 25 is provided to connect the internal bore 23 with a milled slot 27 in the side of the valve body.

Assembled with the valve stem 28 is a piston plate 29, a dished cylinder bottom 30 and the lower plug 9. A snap ring 31 is located in a suitable groove 32 at the lower end of the valve stem 28 to retain the parts in assembly.

The valve stem 28 has an upper part 33 of diameter which shall freely slide in the opening 16 of the cap, a double conical shoulder portion 34 of such angle that it will afford a sealing seat against the shoulder 24 of the upper bore 22, and a lower part 35 of diameter smaller than the shoulder portion. The piston plate 29 has axially located bosses 36, 37 on either side of the plate and is drilled to seat the shoulder 34 of the valve stem 28. The disked cylinder bottom 30 has a vertical side 38 of diameter to fit snugly into bore 19 and of height to extend from shoulder 39 to the undercut 40 at the top of the threaded section 18. It has an axially located orifice 41 on which the boss 37 of piston plate 29 will seat.

The lower plug 9 has two cut-out sides 42 on its threaded section and a transverse slot 43 milled or otherwise cut across its top, substantially normal to the side cutouts 42. From the bottom of the plug is drilled an opening 44 to accommodate the snap ring assembly of the valve stem. Continuing from the apex of the drilled opening, a continuing orifice 45 is drilled through to the slot 43.

The assembly of the valve stem, piston plate, cylinder bottom, and plug is retained as a unit by the snap ring 31 which will not pass through the orifice 45 of the plug.

The assembly of the valve stem, piston plate, cylinder bottom and plug is assembled with the valve body by the careful insertion of the end of the upper half of the valve stem in the openings 16, 26 and threadedly connecting the plug and valve body at 18. As previously mentioned, the dished cylinder bottom fits in the bore 19 and is held securely against the shoulder 39 by the plug 9. Assembly of the various elements together and to the lid of the pressure cooking vessel is easily accomplished inasmuch as the plug 9 has a knurled peripheral surface 46 and the cap 8 has the flat sides 15 for removing it from the valve body.

The valve device, mounted on the lid of a pressure cooker as shown in Fig. 6, is adapted for cooperative association with a control device 47 of the general character disclosed in the first-mentioned patent. Such control device, as shown in Fig. 6, comprises a base 48 in which there is mounted a heating element 49, and a vertical column 50 containing control mechanism including a spring-biased movable member 51. Mounted on member 51 is a hinged element 53 which is suspended freely from it. The present invention is not concerned with the control device 47, apart from the fact that the valve device of the present invention is adapted to cooperate with the member 51. It suffices to note here that the member 51 is actuated by the valve device to cause apparatus 47 to initiate a cooking operation, and said member actuates the valve to effect automatic venting of the pressure in vessel 3 at the end of the cooking operation, unless the vessel is removed from said apparatus for quench cooking as hereinafter described. During automatic venting the steam flows in the direction of the arrows in Fig. 6.

The operation of the valve may best be understood by reference to Figs. 1 to 4. In Fig. 1 the component parts of the valve are shown in the position they assume when no pressure exists in the vessel 2. It should be noted that the piston plate 29 is in its lowest position, resting in the dished cylinder bottom 30. The valve stem 28 is also in its lowermost position, the shoulder 34 resting in sealing contact on the opening in the piston plate upper boss 36. It is in this position of the components that the cooking cycle begins. When the pressure cooking vessel is placed in cooperative association with the control actuating member 51 (Fig. 2), that member exerts a downward force on the valve stem. In the illustrated embodiment, that downward force is just above four ounces, but of course it may be modified in consideration of similar modifications in the weights of the moving components and in the sizes of the various openings and valve seats. As steam pressure rises in the vessel, that pressure is communicated to the piston by a path which is between the bottom of the valve body and the knurled portion of the plug, up past the cutaway section of the threaded upper portion of the plug and to the orifice in the dished cylinder bottom by way of the slot in the top of the plug.

It should be mentioned here that the relationship between the forces acting downward on the piston plate (i. e. the external force applied to the top of the valve stem by the control lever 51 and the gravitational forces downward due to the weight of the valve stem and piston plate) and the diameter of the orifice in the dished cylinder bottom is such that a certain pressure within the vessel (e. g. ten pounds per square inch gauge) will cause the piston plate to unseat from that orifice. As the pressure within the vessel rises to unseat the piston plate from the orifice in the dished cylinder bottom, the pressure is immediately allowed to impinge on the total diameter of the piston plate with a substantially increased total upward force which promptly accelerates the piston plate into the position of Fig. 2. Because of the weight of the valve stem and downward force applied by lever 51, the shoulder 34 remains seated on the piston plate and the valve stem is carried upward by the upward movement of the plate. The upward movement of the valve stem moves the lever 51 upward and initiates a timed cooking cycle. The pressure above mentioned which initiates the cooking cycle is less than full cooking pressure (e. g. fifteen pounds per square inch gauge) by a predetermined amount.

As may be seen from Fig. 2, when pressures in excess of the initial actuating pressure, but less than or equal to the full cooking pressure exist in the vessel, the movable valve elements are disposed in sealing relationship in the top of the valve body. Should the pressure exceed the desired full cooking pressure, the valve stem is moved upward from its seat on the upper boss of the piston plate. Here too, the combination of downward forces on the valve stem (i. e., the loading of the actuating lever and gravitational force due to the weight of the valve stem) and the diameter of the orifice in the piston plate are so related that pressures in the vessel in excess of the full cooking pressure will lift the valve stem from its sealing contact on the upper boss of the piston plate.

As the pressure lifts the shoulder 34 of the valve stem from its sealing contact on the piston plate, steam will flow through the orifice in that plate and around the shoulder of the valve stem into the passage 26. The passage 25 in the valve body top ends in the downwardly directed slot 27 which terminates in the groove 52 formed in the top of the pressure cooker lid. This path permits the steam which is vented from the interior of the vessel to escape to the atmosphere and thus reduce the pressure within the vessel. As the increased pressure is vented, the valve stem is held by the stream of rising steam in a position intermediate the positions of the valve stem shown in Figs. 2 and 4. The valve stem assumes this "floating" position upon the attainment of pressures somewhat in excess of the full cooking pressure, e. g. fifteen pounds per square inch gauge. Should there be a sudden, almost instantaneous surge in pressure of approximately six to eight pounds per square inch above the full cooking pressure, the valve stem will seal in the position shown in Fig. 4. However, that possibility is precluded if the applied heat is insufficient to produce such rise of pressure, as is the case in the automatic control of the first-mentioned patent. Moreover, a stop may be provided in conjunction with lever 51 to prevent such seal.

As hereinbefore stated, rapid cooling of the contents of an automatic pressure cooker is oftentimes desirable. This rapid cooling is usually done by placing the vessel beneath a stream of cold water, as from a faucet. When the cooking vessel is removed from cooperative association with the heating means and control column shown in Fig. 6, the downward force on the valve stem which is exerted by the control lever 51 is removed. The removal of such downward force has a substantial effect on the balance of upward and downward forces and corresponds, in effect, to a pronounced increased internal pressure. Because of the reduced downward load, steam pressure in the vessel near to or substantially below the full cooking pressure will cause the valve stem to rise to the position shown in Fig. 4 wherein it engages the shoulder 24 in the top of the valve body. This engagement effects a seal and prevents the escape of steam pressure from the interior of the vessel. With the valve stem thus raised to the elevated sealing position, the cooker may be placed beneath a cooling stream of water and quickly quenched. The weight of the valve stem is so small, considered with the sealing diameter of the shoulder 24, that it will be retained there until the pressure in the vessel drops to a very small amount. A slight further cooling will reduce the internal pressure to atmospheric and permit the lid of the vessel to be safely removed.

It will be seen, then, that the valve construction shown and described herein provides a valve for a pressure vessel which can, at any first predetermined pressure, supply a substantial actuating force for an associated control, and will prevent gradually increasing pressures within the associated vessel from exceeding a second predetermined pressure higher than the first predetermined pressure, and will prevent the escape of pressure from within the vessel when the vessel is removed from engagement with the associated control.

A further feature of this valve is that it provides for improved venting of the steam at the end of an automatic timed cooking period when a cooling quench is not required. This improved venting feature is claimed in a copending application of Douglas C. Whitaker, Serial No. 253,895, filed October 30, 1951. As described in the first-mentioned patent, at the termination of a timed cooking period, additional downward force is applied to the valve stem through the control lever 51. This increase in loading on the valve stem is predetermined to overcome the upward steam pressure induced force and to cause the piston plate 29 to be moved downward from the top of the valve body. As may be seen in Fig. 2, the stepped main bore 17 of the valve body has three sections of decreasing diameter. The lowest diameter is the largest, and when the dished cylinder bottom 30 is held therein the bore then is composed of lower and upper sections of equal diameters, with the central section of diameter larger than either of the end sections. The clearance between the piston plate periphery and the inside wall of the lowest section of the bore of the valve body is quite small. This small clearance is desirable because, as the piston plate is initially raised from the orifice in the dished cylinder bottom a minimum quantity of steam will leak around the plate. This small leakage will cause a maximum upward force as the valve stem and piston plate are initially accelerated upwards. This, therefore, insures prompt and rapid vertical movement of the plate and valve stem once the seal is broken. The vertical acceleration imparted to the valve stem and piston plate in its rise through the small clearance zone is adequate to insure sufficient velocity past the large clearance middle zone with almost no steam leakage. This is evidenced by the almost complete absence of visible steam from the vent passage during this operation.

At the end of a timed cooking period, the control lever 51 applies a downward force to effect venting as follows. The control lever 51, actuated as described in the above mentioned Turner et al. patent, applies a downward force on the valve stem 28 to break the seal of the piston plate upper boss 36 against the top of the valve body. It should be noted that this downward force is predetermined in relation to the upward pressure to break the seal of the piston plate. This small downward movement permits the steam pressure to vent around the piston plate to the atmosphere at the optimum rate. The piston plate is held upwards against the shoulder 34 of the valve stem by the stream of escaping steam and the pressure difference between the upper and lower sides of the plate. The downward force exerted on the valve stem is so determined that it will break the seal at the top of the piston plate but the piston plate will be held tightly against the shoulder of the valve stem by the passing steam stream. As the pressure in the vessel slowly diminishes the downward force on the valve stem acts to further depress the piston plate towards the enlarged middle section of the valve bore. As the lever 51 depresses the valve stem towards the lowest position the hinged member 53 engages the top of the cap 8. The hinged member 53 prevents further downward movement of the lever 51 and thus holds the piston plate in the enlarged middle section where the clearance around the piston plate is a maximum and the venting is least impeded. This increased venting clearance permits almost all of the remaining pressure to be rapidly "dumped". This "dumping" is desirable because it provides an increased rate of venting as the pressure decreases and thus decreases the total venting time. When the piston plate can no longer be sustained in position in the enlarged middle section it drops to the bottom of the cylinder and the very small remaining pressure vents by holding the valve stem just above the upper boss of the plate.

A further feature of the valve is the simplicity of its structure.

It will be seen that the parts of the valve are all simple elements, although several include inside and outside portions each having several different diameters, as well as external and internal threaded portions. All of these parts are shaped so that they may be made on automatic machinery in simple operational sequences with no undercuts, etc. requiring special tools.

It will also be seen that the parts can be easily disassembled by the housewife and may be cleaned by simply holding the elements in a stream of water.

Although a particular embodiment of the invention has been illustrated and described, it will be understood that the invention is capable of other forms of physical expression and is not limited to the illustrated embodiment.

I claim:

1. A valve device for controlling the pressure of a pressure source under the influence of an external force, comprising a hollow structure in communication with the pressure source and having a pressure outlet to relieve the pressure of said source, a movable valve stem in said structure and extending therefrom for subjection to the external force, said stem having a shoulder portion within said structure, a pressure-operable piston plate within said structure in surrounding relation to said stem and cooperative with said shoulder portion to retain or controllably release the pressure of said source under the influence of said external force, and a pressure-sealing seat on said structure engageable by said shoulder portion in the absence of said external force to retain the pressure of said source.

2. A valve device comprising a valve casing forming a chamber which communicates with a pressure source with which the device is associated, said casing having a passage leading from said chamber to an outlet, a valve stem freely carried by said casing and extending through said chamber and said passage to the exterior of the casing for subjection to external pressure, said valve stem having a shoulder portion capable of entering said passage, a pressure-operable piston plate freely movable within said chamber, said piston plate surrounding said valve stem and being engageable with said shoulder portion to move said valve stem in the direction of said passage, and a valve seat within said passage engageable by said shoulder portion to effect a pressure seal in the absence of said external pressure.

3. A valve device mounted on a support, and comprising a valve body insertable through an opening in said support from one side thereof, a retaining cap threadedly engaging the inserted part of said body, said body being formed to define a chamber and having a passage leading from said chamber to an outlet, an apertured member seated in said body, a retaining plug threadedly engaging said body and serving to hold said member in place, said plug being formed to provide a passageway to the aperture in said member, thus placing said chamber in communication with a pressure source with which the device is associated, a valve stem supported by said body and said plug for axial movement, said valve stem extending through said chamber and said passage to the exterior of said body for subjection to external pressure, said valve stem having a shoulder portion thereon, and a piston plate freely disposed in said chamber for movement therein and having an aperture through which said valve stem extends, the inner edge of said plate about the aperture thereof being engageable with the shoulder portion on said valve stem.

4. A valve device mounted on a horizontal support, and comprising a valve body, means removably retaining said valve body within an opening in said support, said body being formed to define a chamber and having a passage leading upward from said chamber to an outlet, an apertured bottom member seated in the lower part of said body, a retaining plug threadedly engaging the bottom of said body and serving to hold said bottom member in place, said plug being formed to provide a passageway to the aperture in said bottom member, thus placing said chamber in communication with a pressure source with which the device is associated, a vertical valve stem supported by said body and said plug for vertical movement, said valve stem extending through said chamber and the passage thereabove to the upper exterior of said body for subjection to external pressure, said valve stem having a shoulder portion thereon capable of entering said passage, a piston plate freely disposed in said chamber for vertical movement therein and having an aperture through which said valve stem extends, the inner edge of said plate about the aperture thereof being engageable with the shoulder portion on said valve stem, and a valve seat in said passage engageable by said shoulder portion to effect a pressure seal in the absence of said external pressure.

5. A valve device for use on a pressure vessel, comprising a casing having an inlet port and a second port in communication with the atmosphere, a first valve member in said casing movable between said ports and adapted to sealingly engage the same, said member having an aperture therein, a second movable valve member extending externally of said casing for subjection to an external force, said second member being adapted to cover said aperture and being movable by and with said first member under the influence of pressure within the inlet port, said members normally being in position cooperatively to seal said first port and being movable together to seal said second port when the pressure of the inlet port rises to a predetermined value, said second member being further movable to uncover said aperture whenever the pressure of the inlet port exceeds a predetermined higher value, and a pressure-sealing seat on said casing engageable by said second member in the absence of said external force to retain the pressure of the inlet port.

6. A valve device for use on a pressure vessel, comprising a casing having an inlet port and a second port in communication with the atmosphere, a pressure-operable piston plate in said casing movable between said ports and adapted to sealingly engage the same, said plate having an aperture therein, a movable valve stem extending externally of said casing for subjection to an external force, said stem having a shoulder portion engageable with the inner edge of said plate about said aperture to cover the aperture and to effect movement of said stem by plate under the influence of pressure within the inlet port, the said plate and said stem normally being in position cooperatively to seal said first port and being movable together to seal said second port when the pressure of the inlet port rises to a predetermined value, said stem being further movable to uncover said aperture whenever the pressure of the inlet port exceeds a predetermined higher value, and a pressure-sealing seat on said casing engageable by said shoulder portion in the absence of said external force to retain the pressure of the inlet port.

7. A valve device for use on a pressure vessel, comprising a casing having an inlet port and a second port in communication with the atmosphere, said casing having an outlet passage leading from said second port, a first valve member in said casing movable between said ports and adapted to sealingly engage the same, said member having an aperture therein, a second movable valve member extending externally of said casing for subjection to an external force, said second member being adapted to cover said aperture and being movable by and with said first member under the influence of pressure within the inlet port, said members normally being in position cooperatively to seal said first port and being movable together to seal said second port when the pressure of the inlet port rises to a predetermined value, said second member being further movable to uncover said aperture whenever the pressure of the inlet port exceeds a predetermined higher value, and a pressure-sealing seat within said outlet passage engageable by said second member in the absence of said external force to retain the pressure of the inlet port.

References Cited in the file of this patent

UNITED STATES PATENTS

| Number | Name | Date |
|---|---|---|
| 851,220 | Bowers | Apr. 23, 1907 |
| 1,030,306 | Hull | June 25, 1912 |
| 1,202,067 | Hulslander | Oct. 24, 1916 |
| 1,408,979 | Brown | Mar. 7, 1922 |
| 1,515,184 | Waggoner | Nov. 11, 1924 |
| 1,756,787 | Goughous | Apr. 29, 1930 |
| 2,071,390 | Crowell | Feb. 23, 1937 |
| 2,111,858 | Jensen | Mar. 22, 1938 |
| 2,369,932 | Allen | Feb. 20, 1945 |